(12) United States Patent
Lin

(10) Patent No.: US 11,183,204 B2
(45) Date of Patent: Nov. 23, 2021

(54) SOUND RECOGNITION SYSTEM AND METHOD

(71) Applicant: HON HAI PRECISION INDUSTRY CO., LTD., New Taipei (TW)

(72) Inventor: Jung-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 193 days.

(21) Appl. No.: 16/503,707

(22) Filed: Jul. 5, 2019

(65) Prior Publication Data

US 2020/0294526 A1 Sep. 17, 2020

(30) Foreign Application Priority Data

Mar. 14, 2019 (CN) .......................... 201910197137.3

(51) Int. Cl.
| | | |
|---|---|---|
| *G10L 15/00* | (2013.01) | |
| *G10L 25/51* | (2013.01) | |
| *G10L 15/22* | (2006.01) | |
| *G10L 15/16* | (2006.01) | |
| *G06K 9/00* | (2006.01) | |
| *G10L 19/00* | (2013.01) | |
| *G10L 15/04* | (2013.01) | |
| *G10L 15/30* | (2013.01) | |

(52) U.S. Cl.
CPC ............ *G10L 25/51* (2013.01); *G06K 9/0053* (2013.01); *G10L 15/04* (2013.01); *G10L 15/16* (2013.01); *G10L 15/22* (2013.01); *G10L 15/30* (2013.01); *G10L 19/00* (2013.01)

(58) Field of Classification Search
CPC combination set(s) only.
See application file for complete search history.

(56) References Cited

U.S. PATENT DOCUMENTS

| | | | |
|---|---|---|---|
| 9,990,565 B2* | 6/2018 | Rhoads | .................. H04N 7/185 |
| 10,147,433 B1 | 12/2018 | Bradley | |
| 2007/0291958 A1 | 12/2007 | Jehan | |
| 2020/0184991 A1* | 6/2020 | Cleve | ........................ H04S 7/40 |

\* cited by examiner

*Primary Examiner* — Vu B Hang
(74) *Attorney, Agent, or Firm* — ScienBiziP, P.C.

(57) ABSTRACT

A voice recognition system includes a computing device and at least one mobile terminal communicatively coupled to the computing device through a network. The computing device obtains an original sound from the at least one mobile terminal and converts the original sound into a digitized time-frequency map, performs compression segmentation on the time-frequency map to obtain a sound image corresponding to the time-frequency map, and uses an image recognition method to recognize the sound image, obtain an enhanced sound image, and search a preset database for sound information corresponding to the enhanced sound image.

14 Claims, 4 Drawing Sheets

SOUND RECOGNITION SYSTEM AND METHOD

FIELD

The subject matter herein generally relates to voice recognition, and more particularly to a sound recognition system and a sound recognition method.

BACKGROUND

Generally, voice recognition systems convert audio into a time-frequency map of sound information, and then an image processing method is used on the time-frequency map to extract sound information. However, the time-frequency map is compressed according to an aspect ratio of the image processing model, which may cause loss of sound information.

BRIEF DESCRIPTION OF THE DRAWINGS

Implementations of the present disclosure will now be described, by way of embodiments, with reference to the attached figures.

DETAILED DESCRIPTION

Figure 1:
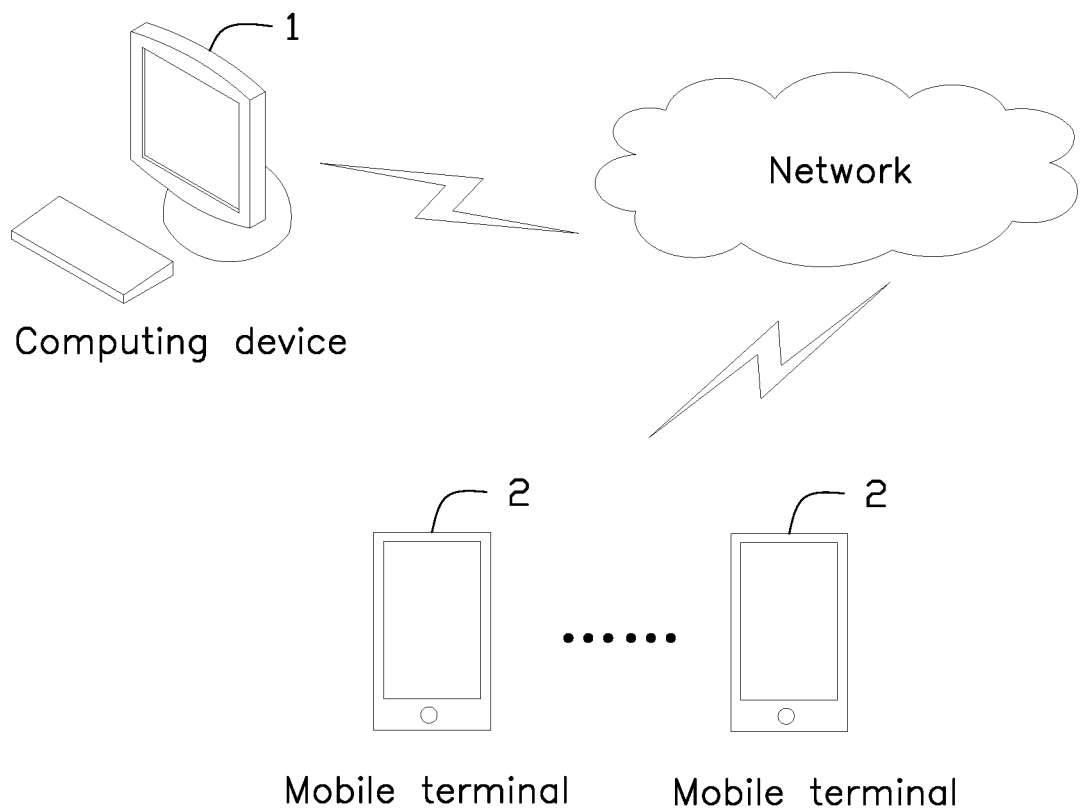
FIG. 1 is a diagram of an embodiment of a sound recognition system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a voice recognition system. The voice recognition system includes a computing device 1 and at least one mobile terminal 2. The computing device 1 and the at least one mobile terminal 2 are communicably coupled through a network. The network may be a wired network or a wireless network, such as radio, Wireless Fidelity (WIFI), cellular, satellite, broadcast, or the like.

The computing device 1 may be an electronic device equipped with voice recognition software and storing a preset database storing an image corresponding to each sound. The computing device 1 may be a personal computer, a server, or the like, wherein the server may be a single server, a server cluster, or a cloud server.

The mobile terminal 2 may be an electronic device such as a smart phone, a tablet computer, a laptop computer, a desktop computer, a smart home, a smart in-vehicle system, or the like having voice recognition functions.

The mobile terminal 2 obtains original sound through a sound capturing device, such as a microphone. The mobile terminal 2 sends the original sound to the computing device 1, and the computing device 1 converts the original sound into a time-frequency map and then compresses and segments the time-frequency map to obtain a sound image. The sound image is recognized by an image recognition method. A sound corresponding to the sound image is searched in the database and then sent to the mobile terminal 2.

In another embodiment, the computing device 1 is omitted, so that the mobile terminal 2 performs all of the functions of the computing device 1.

Figure 2:
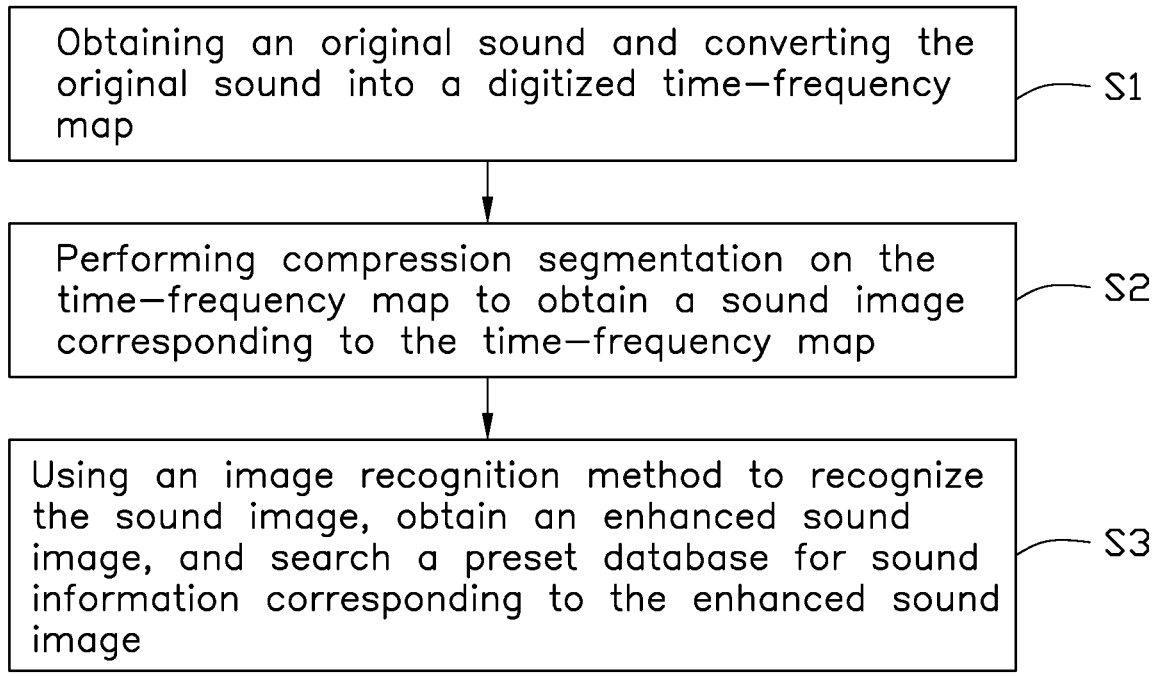
FIG. 2 is a flowchart of an embodiment of a sound recognition method.

FIG. 2 shows a flowchart of a voice recognition method. The method is provided by way of embodiment, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S1, an original sound is obtained and converted into a digitized time-frequency map.

In one embodiment, after the original sound is obtained, the original sound is sampled to obtain a digital sound file, and then the time-frequency map is obtained through mathematical transformation.

In one embodiment, the original sound is not subjected to compression conversion.

In one embodiment, the mathematical transformation is a Fourier transform.

In one embodiment, the original sound may be acquired from a sound collection device, such as a microphone of the mobile terminal 2. The original sound acquired by the sound collection device is not compressed by the sound collection device. In one embodiment, an audio file of the original sound acquired by the sound collection device is saved in .wav format.

A method of sampling an audio file in .wav format to obtain a digital sound file, and converting the digital sound file into a time-frequency map by using the Fourier transform is generally known in the related art and will not be described in detail herein.

In other embodiments, the original sound may also be obtained from a preset memory.

At block S2, compression and segmentation are performed on the time-frequency map to obtain a sound image corresponding to the time-frequency map.

In this embodiment, the compression and segmentation process includes the following steps:

Step 1: after obtaining the time-frequency map of a sound signal, sound intensity information corresponding to different frequencies in preset frequency ranges and preset time ranges of the time-frequency map are acquired and sorted. The sorted sound intensity information forms a one-dimensional vector, each vector element of the one-dimensional is a sound intensity, and a length of the one-dimensional vector is the same as the number of the preset frequency range.

The sound intensity information corresponding to different frequencies are statistically sorted according to the sound intensities of the same frequency. The statistical sorting method may include any one of a mean, a weighted average, and a maximum value.

Step 2: the one-dimensional vector is then segmented at preset intervals to obtain multiple segmented one-dimensional vectors.

Step 3: all of the segmented one-dimensional vectors are combined into a multi-dimensional vector, and then the multi-dimensional vector is expressed as an image. For example, if the one-dimensional vector is [23,30,50,45,35,40,42,28,30], and then the one dimensional vector is segmented into three segmented one-dimensional vectors: [23,30,50], [45,35,40], and [42,28,30]. All of the three one-dimensional vectors are combined into a multi-dimensional vector:

$$\begin{bmatrix} 23 & 30 & 50 \\ 45 & 35 & 40 \\ 42 & 28 & 30 \end{bmatrix}.$$

And then, the multi-dimensional is expressed as an image. It can be understood that this example is just to explain the method but not to limit.

Step 4: whether a size of the image matches a preset image size is determined. If the size of the image matches the preset image size, an image recognition method is used to recognize the image. If the size of the image does not match the preset image size, the image is filled in to match the preset image size.

The image is a multi-dimensional matrix composed of sound intensity elements. A size of the matrix is N×L, and a size of the preset image is L×L. If N and L are not equal, the matrix is expanded. Blank elements of the expanded matrix are filled with 0.

In this embodiment, the preset frequency range is related to the preset image size and a sound frequency range discernable by the human ear. The preset frequency range is F, the preset image size is L×L, a maximum frequency is 20000 Hz, and a minimum frequency is 20 Hz. The preset frequency range can be calculated according to the formula:

$$F=L\times(20000-20)/L$$

In the formula, the sound frequency range discernable by the human ear is equal to the maximum frequency minus the minimum frequency. If the sound frequency range is not divisible by the preset image size L, an integer part of the quotient is incremented by one.

In one embodiment of the invention, the image recognition method is a VGGNet model based on a convolutional neural network, and the image size of the data model is 224×224. According to the image size of 224×224, the maximum frequency of 20000 Hz, and the minimum frequency of 20 Hz, the preset frequency range is calculated to be 20160. The preset time range is 3 ms.

The sound intensity information corresponding to the sound frequencies in the range of 3 ms are acquired and statistically sorted on the same frequency. In one embodiment, the weighted average is used, and the sorted sound intensity is taken as a one-dimensional vector having a length of 20160 and constituted by vector elements. The vector elements in the one-dimensional vector are the sound intensities.

Each one-dimensional vector is segmented into segments by a predetermined interval, that is, the image size L, to obtain ninety segmented one-dimensional each of which has a length of 224.

The ninety segmented one-dimensional vectors are combined into a multi-dimensional matrix having a dimension of 90×224, and the multi-dimensional matrix is represented by an image.

The image size 90×224, which does not match the image size 224×224 of the data model, is enlarged by filling the multi-dimensional matrix 90×224 to 224×224. The blank elements in the two-dimensional matrix are filled with 0.

At block S3, an image recognition method is used to recognize the sound image, obtain an enhanced sound image, and search the preset database for sound information corresponding to the enhanced sound image.

In at least one embodiment, the image recognition method is a convolutional neural network identification method.

After the sound image is imported into the convolutional neural network and processed by the convolution layer, the pooling layer, and the fully connected layer, the enhanced sound image having enhanced image information is obtained.

A sound corresponding to the sound image is obtained by comparing the image information of the enhanced sound image with the corresponding image in a preset database.

For example, the sound image is substituted into the convolutional neural network using the VGGNet model. After processing by the convolution layer, the pooling layer, and the fully connected layer, the enhanced sound image is obtained. The enhanced sound image is compared to the sound images in the database to find the sound corresponding to the sound image.

Figure 3:
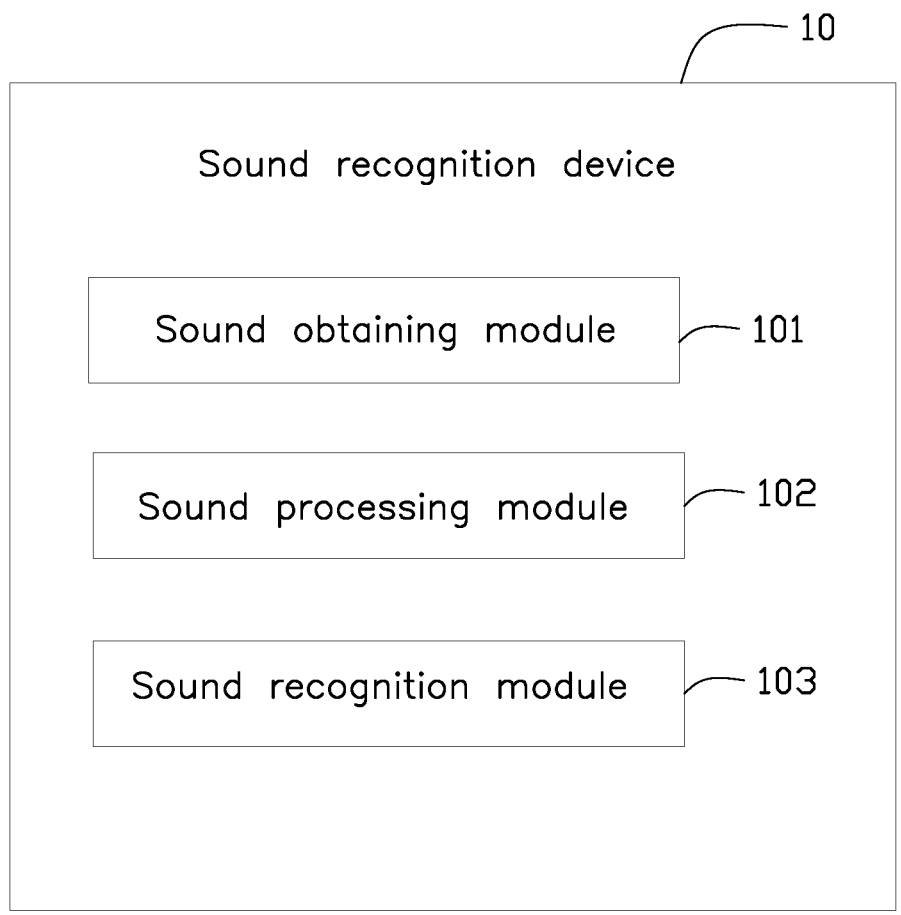
FIG. 3 is a block diagram of an embodiment of a sound recognition device.

FIG. 3 shows a block diagram of an embodiment of a voice recognition device 10. The voice recognition device 10 may operate in a computing device, such as the computing device 1. The voice recognition device 10 may include a plurality of functional modules according to functions performed by the voice recognition device 10. The functional modules may include a sound obtaining module 101, a sound processing module 102, and a sound recognition module 103.

The sound obtaining module 101 obtains an original sound through a sound collection device and converts the original sound into a digitized time-frequency map.

In one embodiment, after the original sound is obtained, the original sound is sampled to obtain a digital sound file, and then the time-frequency map is obtained through mathematical transformation.

In one embodiment, the original sound is not subjected to compression conversion.

In one embodiment, the mathematical transformation is a Fourier transform.

In one embodiment, the original sound may be acquired from a sound collection device, such as a microphone of the mobile terminal 2. The original sound acquired by the sound collection device is not compressed by the sound collection device. In one embodiment, an audio file of the original sound acquired by the sound collection device is saved in .wav format.

A method of sampling an audio file in .wav format to obtain a digital sound file, and converting the digital sound file into a time-frequency map by using the Fourier transform is generally known in the related art and will not be described in detail herein.

In other embodiments, the original sound may also be obtained from a preset memory.

The sound processing module 102 compresses and segments the time-frequency map to obtain a sound image corresponding to the time-frequency map.

In this embodiment, the compression and segmentation process includes the following steps:

Step 1: after obtaining the time-frequency map of a sound signal, sound intensity information corresponding to different frequencies in preset frequency ranges and preset time ranges of the time-frequency map are acquired and sorted. The sorted sound intensity information forms a one-dimensional vector, each vector element of the one-dimensional is a sound intensity, and a length of the one-dimensional vector is the same as the number of the preset frequency range.

The sound intensity information corresponding to different frequencies are statistically sorted according to the sound intensities of the same frequency. The statistical sorting method may include any one of a mean, a weighted average, and a maximum value.

Step 2: the one-dimensional vector is then segmented at preset intervals to obtain multiple segmented one-dimensional vectors.

Step 3: all of the segmented one-dimensional vectors are combined into a multi-dimensional vector, and then the multi-dimensional vector is expressed as an image. For example, if the one-dimensional vector is [23,30,50,45,35, 40,42,28,30], and then the one dimensional vector is segmented into three segmented one-dimensional vectors:[23, 30,50], [45,35,40], and [42,28,30]. All of the three one-dimensional vectors are combined into a multi-dimensional vector:

$$\begin{bmatrix} 23 & 30 & 50 \\ 45 & 35 & 40 \\ 42 & 28 & 30 \end{bmatrix}.$$

And then, the multi-dimensional is expressed as an image. It can be understood that this example is just to explain the method but not to limit.

Step 4: whether a size of the image matches a preset image size is determined. If the size of the image matches the preset image size, an image recognition method is used to recognize the image. If the size of the image does not match the preset image size, the image is filled in to match the preset image size.

The image is a multi-dimensional matrix composed of sound intensity elements. A size of the matrix is N×L, and a size of the preset image is L×L. If N and L are not equal, the matrix is expanded. Blank elements of the expanded matrix are filled with 0.

In this embodiment, the preset frequency range is related to the preset image size and a sound frequency range discernable by the human ear. The preset frequency range is F, the preset image size is L×L, a maximum frequency is 20000 Hz, and a minimum frequency is 20 Hz. The preset frequency range can be calculated according to the formula:

$$F = L \times (20000 - 20)/L$$

In the formula, the sound frequency range discernable by the human ear is equal to the maximum frequency minus the minimum frequency. If the sound frequency range is not divisible by the preset image size L, an integer part of the quotient is incremented by one.

In one embodiment of the invention, the image recognition method is a VGGNet model based on a convolutional neural network, and the image size of the data model is 224×224. According to the image size of 224×224, the maximum frequency of 20000 Hz, and the minimum frequency of 20 Hz, the preset frequency range is calculated to be 20160. The preset time range is 3 ms.

The sound intensity information corresponding to the sound frequencies in the range of 3 ms are acquired and statistically sorted on the same frequency. In one embodiment, the weighted average is used, and the sorted sound intensity is taken as a one-dimensional vector having a length of 20160 and constituted by vector elements. The vector elements in the one-dimensional vector are the sound intensities.

Each one-dimensional vector is segmented into segments by a predetermined interval, that is, the image size L, to obtain ninety segmented one-dimensional each of which has a length of 224.

The ninety segmented one-dimensional vectors are combined into a multi-dimensional matrix having a dimension of 90×224, and the multi-dimensional matrix is represented by an image.

The image size 90×224, which does not match the image size 224×224 of the data model, is enlarged by filling the multi-dimensional matrix 90×224 to 224×224. The blank elements in the two-dimensional matrix are filled with 0.

The sound recognition module 103 recognizes the sound image by an image recognition method, obtains an enhanced sound image, and searches the preset database for sound information corresponding to the enhanced sound image.

In at least one embodiment, the image recognition method is a convolutional neural network identification method.

After the sound image is imported into the convolutional neural network and processed by the convolution layer, the pooling layer, and the fully connected layer, the enhanced sound image having enhanced image information is obtained.

A sound corresponding to the sound image is obtained by comparing the image information of the enhanced sound image with the corresponding image in a preset database.

For example, the sound image is substituted into the convolutional neural network using the VGGNet model. After processing by the convolution layer, the pooling layer, and the fully connected layer, the enhanced sound image is obtained. The enhanced sound image is compared to the sound images in the database to find the sound corresponding to the sound image.

Figure 4:
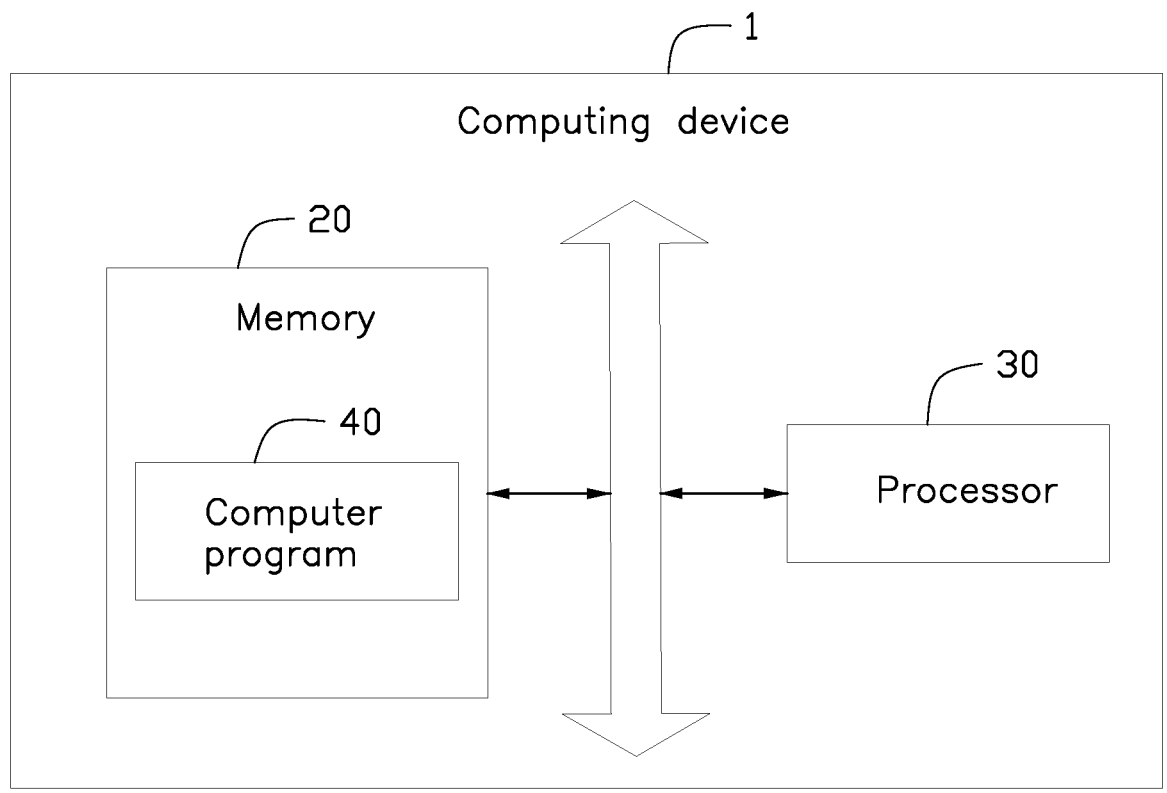
FIG. 4 is a block diagram of an embodiment of a computing device.

FIG. 4 shows a block diagram of the computing device 1. The computing device 1 includes a memory 20 and a processor 30. The memory 20 stores a computer program 40, such as a voice recognition program, which is executed by the processor 30. When the processor 30 executes the computer program 40, the blocks in the voice recognition method may be implemented, such as the blocks S1-S3 shown in FIG. 2. Alternatively, when the processor 30 executes the computer program 40, the functions of the functional modules in the voice recognition device 10 shown in FIG. 3 may be implemented.

The computer program 40 can be partitioned into one or more modules/units that are stored in the memory 20 and executed by the processor 30. The one or more modules/units may be a series of computer program instructions capable of performing particular functions of the computer program 40. For example, the computer program 40 can be segmented into the database creation module 101, the matching module 102, the location labeling module 103, and the display module 104.

The computing device 1 may be a desktop computer, a notebook computer, a cloud server, or the like. The computing device 1 may include more or less components than those illustrated, and some components may be combined. The computing device 1 may also include input and output devices, network access devices, buses, and the like.

The processor 30 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The processor 30 may be a microprocessor or other processor known in the art.

The memory 20 can be used to store the computer program 40 and/or modules/units by running or executing computer programs and/or modules/units stored in the memory 20. The memory 20 may include a storage program area and a storage data area. In addition, the memory 20 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A sound recognition method comprising:
   obtaining an original sound and converting the original sound into a digitized time-frequency map;
   performing compression and segmentation on the time-frequency map to obtain a sound image corresponding to the time-frequency map; and
   recognizing the sound image by an image recognition method, obtaining an enhanced sound image, and searching a preset database for sound information corresponding to the enhanced sound image;
   wherein the method of compressing and segmenting comprises:
   after obtaining the time-frequency map, acquiring and sorting sound intensity information corresponding to different frequencies in preset frequency ranges and preset time ranges of the time-frequency map, wherein the sorted sound intensity information forms a one-dimensional vector, each vector element of the one-dimensional is a sound intensity, and a length of the one-dimensional vector is the same as the number of the preset frequency range;
   segmenting the one-dimensional vector at preset intervals to obtain multiple segmented one-dimensional vectors;
   combining all of the segmented one-dimensional vectors into a multi-dimensional vector, wherein the multi-dimensional vector is expressed as an image;
   determining if a size of the image matches a preset image size, wherein:
   if the size of the image matches the preset image size, an image recognition method is used to recognize the image, and
   if the size of the image does not match the preset image size, the image is filled in to match the preset image size.

2. The sound recognition method of claim 1, wherein after the original sound is obtained, the method further comprising;
   sampling the original sound to obtain a digital sound file; and
   obtaining the time-frequency map from the digital sound file by applying a mathematical transformation.

3. The sound recognition method of claim 2, wherein the mathematical transformation is a Fourier transform.

4. The voice recognition method of claim 1, wherein:
   the preset frequency range is related to the preset image size and a sound frequency range discernable by a human ear;
   the preset frequency range is F, the preset image size is L×L, a maximum frequency is 20000 Hz, and a minimum frequency is 20 Hz;
   the preset frequency range is calculated according to the formula: $F=L\times(20000-20)/L$;
   if the sound frequency range is not divisible by the preset image size L, an integer part of the quotient is incremented by one.

5. The voice recognition method of claim 1, wherein:
   the sound intensity information corresponding to different frequencies are statistically sorted according to the sound intensities of the same frequency;
   a statistical sorting method comprises any one of a mean, a weighted average, and a maximum value.

6. The voice recognition method of claim 1, wherein:
   the sound image is a multi-dimensional matrix composed of sound intensity elements;
   a size of the matrix is N×L, and a size of the preset image is L×L;
   if N and L are not equal, the matrix is expanded;
   blank elements of the expanded matrix are filled with zeroes.

7. The voice recognition method of claim 1, wherein:
   the image recognition method is a convolutional neural network identification method;
   after the sound image is imported into the convolutional neural network and processed by a convolution layer, a pooling layer, and a fully connected layer, an enhanced sound image having enhanced image information is obtained;

a sound corresponding to the sound image is obtained by comparing the image information of the enhanced sound image with the corresponding image in the preset database.

8. A voice recognition system comprising:

a computing device; and at least one mobile terminal communicatively coupled to the computing device through a network; wherein:

the computing device obtains an original sound from the at least one mobile terminal and converts the original sound into a digitized time-frequency map, performs compression segmentation on the time-frequency map to obtain a sound image corresponding to the time-frequency map, and recognizes the sound image by an image recognition method, obtains an enhanced sound image, and searches a preset database for sound information corresponding to the enhanced sound image;

wherein the method of compressing and segmenting comprises:

after obtaining the time-frequency map, acquiring and sorting sound intensity information corresponding to different frequencies in preset frequency ranges and preset time ranges of the time-frequency map, wherein the sorted sound intensity information forms a one-dimensional vector, each vector element of the one-dimensional is a sound intensity, and a length of the one-dimensional vector is the same as the number of the preset frequency range;

segmenting the one-dimensional vector at preset intervals to obtain multiple segmented one-dimensional vectors;

combining all of the segmented one-dimensional vectors into a multi-dimensional vector, wherein the multi-dimensional vector is expressed as an image;

determining if a size of the image matches a preset image size, wherein:

if the size of the image matches the preset image size, an image recognition method is used to recognize the image, and if the size of the image does not match the preset image size, the image is filled in to match the preset image size.

9. The voice recognition system of claim 8, wherein:

after the original sound is obtained, the original sound is sampled to obtain a digital sound file; and the time-frequency map is obtained through mathematical transformation.

10. The voice recognition system of claim 9, wherein the mathematical transformation is a Fourier transform.

11. The voice recognition system of claim 8, wherein:

the preset frequency range is related to the preset image size and a sound frequency range discernable by a human ear;

the preset frequency range is F, the preset image size is L×L, a maximum frequency is 20000 Hz, and a minimum frequency is 20 Hz;

the preset frequency range is calculated according to the formula: F=L×(20000-20)/L;

if the sound frequency range is not divisible by the preset image size L, an integer part of the quotient is incremented by one.

12. The voice recognition system of claim 8, wherein:

the sound intensity information corresponding to different frequencies are statistically sorted according to the sound intensities of the same frequency;

a statistical sorting method comprises any one of a mean, a weighted average, and a maximum value.

13. The voice recognition system of claim 8, wherein:

the sound image is a multi-dimensional matrix composed of sound intensity elements;

a size of the matrix is N×L, and a size of the preset image is L×L;

if N and L are not equal, the matrix is expanded;

blank elements of the expanded matrix are filled with zeroes.

14. The voice recognition system of claim 8, wherein:

the image recognition method is a convolutional neural network identification method;

after the sound image is imported into the convolutional neural network and processed by a convolution layer, a pooling layer, and a fully connected layer, an enhanced sound image having enhanced image information is obtained;

a sound corresponding to the sound image is obtained by comparing the image information of the enhanced sound image with the corresponding image in the preset database.

* * * * *